(12) United States Patent
Shekhar et al.

(10) Patent No.: US 11,343,654 B2
(45) Date of Patent: May 24, 2022

(54) APPARATUS AND METHOD FOR SHARING CONTENT

(71) Applicant: Samsung Electronics Co., Ltd., Suwon-si (KR)

(72) Inventors: Shashank Shekhar, Pradesh (IN); Theophilus Thomas, Pradesh (IN); Dhananjay L Govekar, Pradesh (IN); Arun Prabhakar, Pradesh (IN); Ashwini Kumar Kulshrestha, Pradesh (IN); Gaurav Chandra Singh Mehra, Pradesh (IN); Saurabh Pareek, Pradesh (IN); Gaurav Gilhotra, Pradesh (IN); Sandeep Goyal, Pradesh (IN); Ankesh Kasliwal, Pradesh (IN); Ganesh Kumar, Pradesh (IN); Govind Singh, Pradesh (IN); Iti Jain, Pradesh (IN); Rahul Marepalli, Pradesh (IN); Silky Dudeja, Pradesh (IN); Sulabh Rastogi, Pradesh (IN); Tarun Gupta, Pradesh (IN); Shikha Goyal, Pradesh (IN); Nishant Chaubey, Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 16/767,395

(22) PCT Filed: Dec. 12, 2018

(86) PCT No.: PCT/KR2018/015785
§ 371 (c)(1),
(2) Date: May 27, 2020

(87) PCT Pub. No.: WO2019/117625
PCT Pub. Date: Jun. 20, 2019

(65) Prior Publication Data
US 2020/0396569 A1  Dec. 17, 2020

(30) Foreign Application Priority Data

Dec. 12, 2017  (IN) .............................. 201711044626

(51) Int. Cl.
*H04W 4/08* (2009.01)
*H04W 4/80* (2018.01)
(Continued)

(52) U.S. Cl.
CPC ........... *H04W 4/08* (2013.01); *H04L 67/1046* (2013.01); *H04W 4/18* (2013.01); *H04W 4/80* (2018.02)

(58) Field of Classification Search
CPC ....... H04W 4/21; H04W 4/023; H04W 12/00; H04W 12/77; H04W 4/08; H04W 4/24; H04W 4/70; H04W 84/18; H04W 88/02
See application file for complete search history.

(56) References Cited

U.S. PATENT DOCUMENTS 7,626,949 B2  12/2009  Berler et al.
8,190,745 B2   5/2012  Xiao et al.
(Continued)

FOREIGN PATENT DOCUMENTS

CN  101600183 A  12/2009
JP  2013-196233 A  9/2013
(Continued)

OTHER PUBLICATIONS

Bandwidth Ruler Free [wo ROOT], https://play.google.com/store/apps/details?id=com.bwr.free&hl=en_IN, May 2015.
(Continued)

Primary Examiner — Kwasi Karikari
(74) Attorney, Agent, or Firm — Jefferson IP Law, LLP

(57) ABSTRACT

The present disclosure provides an apparatus and method for sharing content. A method provided in the present disclosure
(Continued)

comprises receiving a message to request to join a content sharing group from a second device while a third device included in the content sharing group transmits first content shared in the content sharing group to a fourth device included in the content sharing group, adding the second device to the content sharing group, and permitting the second device to access the first content.

13 Claims, 15 Drawing Sheets

(51) Int. Cl.
*H04L 67/1042* (2022.01)
*H04W 4/18* (2009.01)

(56) References Cited

U.S. PATENT DOCUMENTS

| | | |
|---|---|---|
| 8,244,996 B2 | 8/2012 | Yamane |
| 8,776,037 B2 | 7/2014 | Gee et al. |
| 9,258,712 B2 | 2/2016 | Kiukkonen et al. |
| 9,363,199 B1 | 6/2016 | McCabe |
| 9,462,137 B2 | 10/2016 | Vetaal et al. |
| 2007/0223398 A1 | 9/2007 | Luo et al. |
| 2007/0232292 A1* | 10/2007 | Larocca ............ H04M 1/72448 455/425 |
| 2009/0307361 A1 | 12/2009 | Issa et al. |
| 2011/0028083 A1 | 2/2011 | Soitis |
| 2017/0093780 A1* | 3/2017 | Lieb .................... G06T 3/40 |
| 2017/0094054 A1 | 3/2017 | Li |
| 2017/0118177 A1 | 4/2017 | Dutta et al. |
| 2017/0164163 A1 | 6/2017 | Lee et al. |
| 2017/0249341 A1* | 8/2017 | Gao ................ G06K 9/00221 |

FOREIGN PATENT DOCUMENTS

| | | |
|---|---|---|
| KR | 10-0393786 B1 | 12/2000 |
| KR | 10-2016-0066493 A | 6/2016 |
| KR | 10-2017-0069445 A | 6/2017 |

OTHER PUBLICATIONS

Indian Office Action dated Aug. 14, 2020, issued in Indian Patent Application No. 201711044626.

* cited by examiner

[Fig. 1]
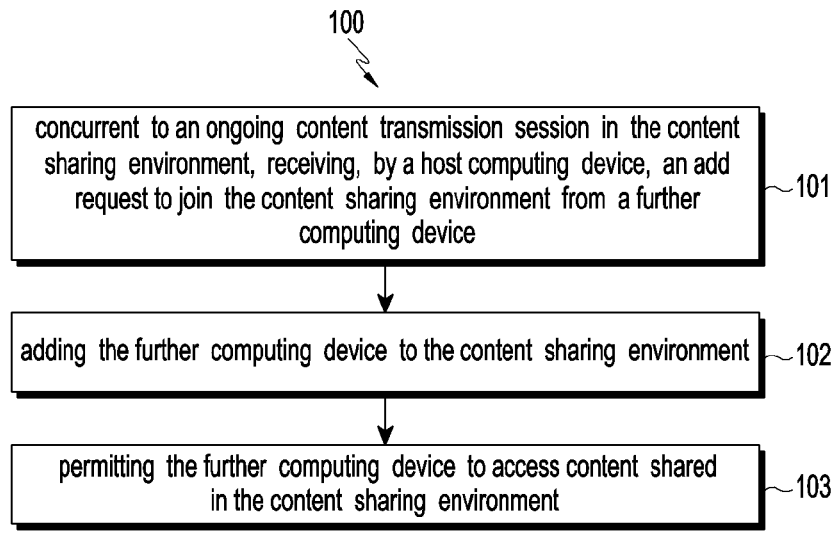
[Fig. 2]
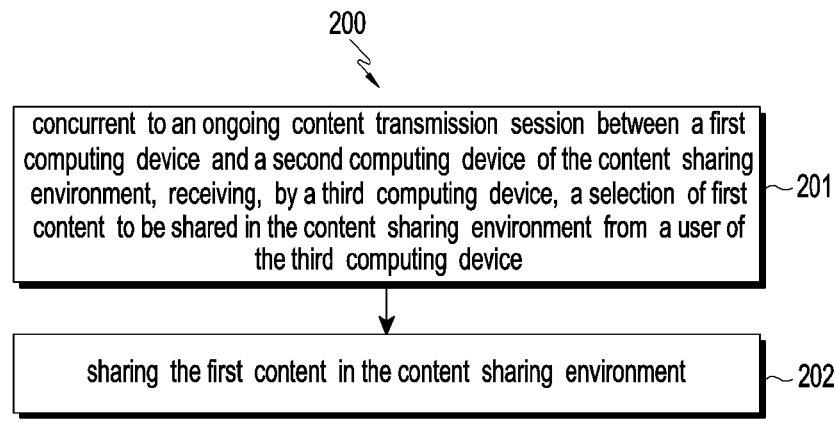
[Fig. 3]
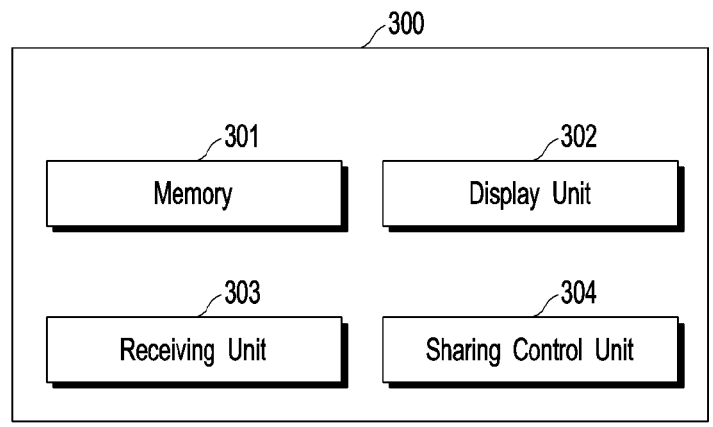

[Fig. 4a]
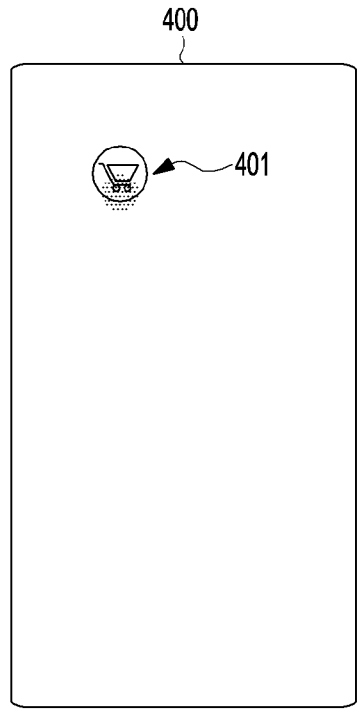
[Fig. 4b]
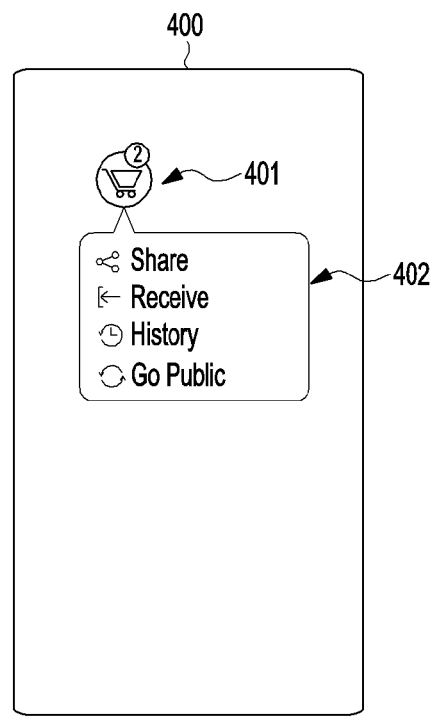

[Fig. 4c]
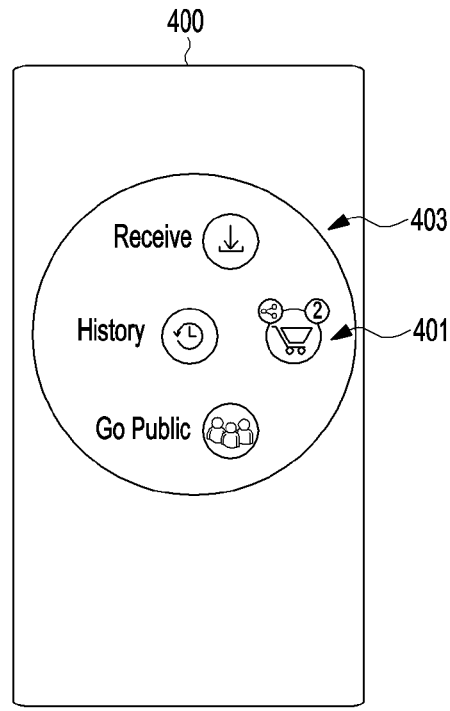
[Fig. 5a]
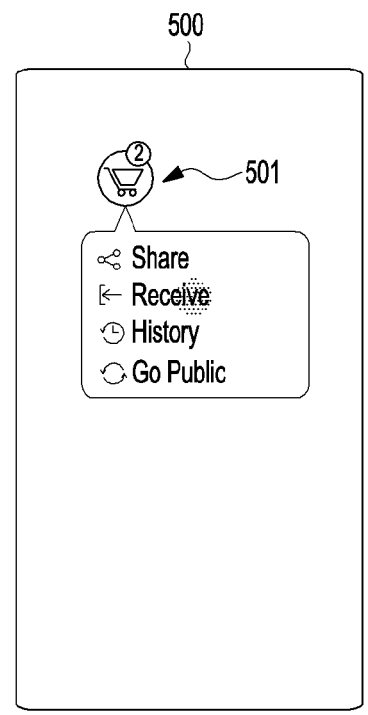

[Fig. 5b]
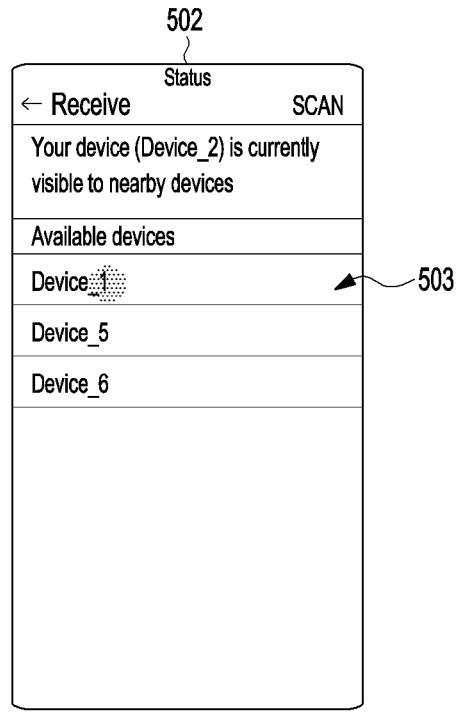
[Fig. 5c]
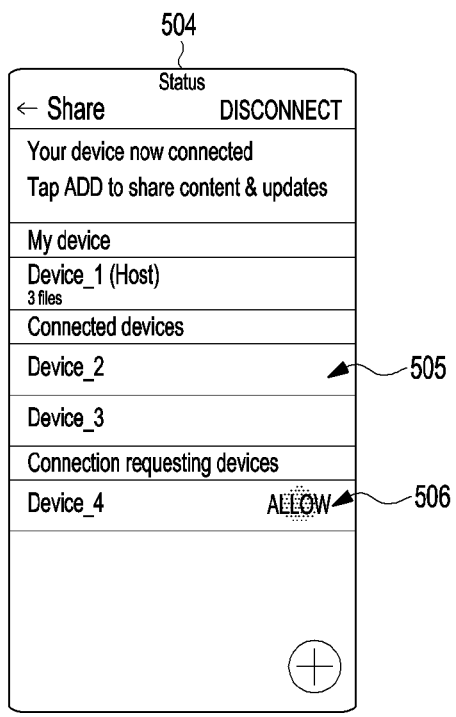

[Fig. 5d]
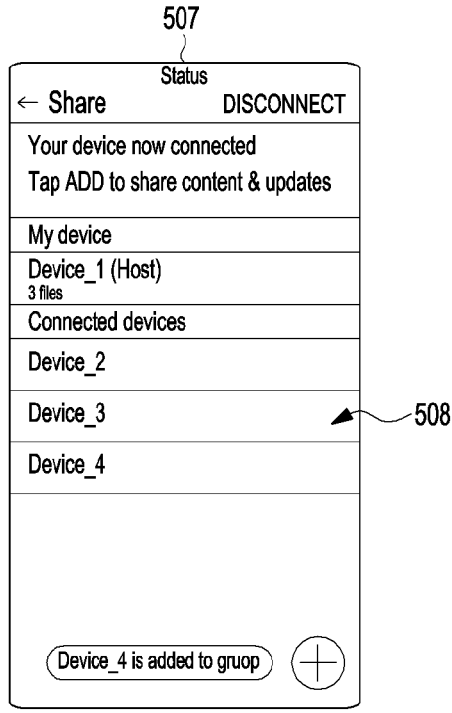
[Fig. 6a]
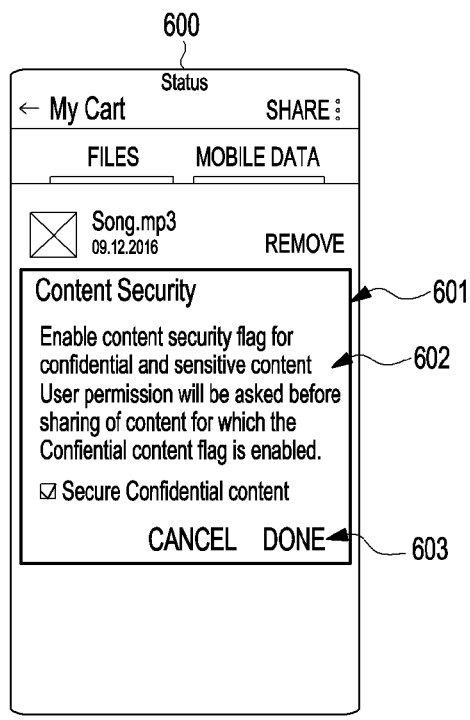

[Fig. 6b]
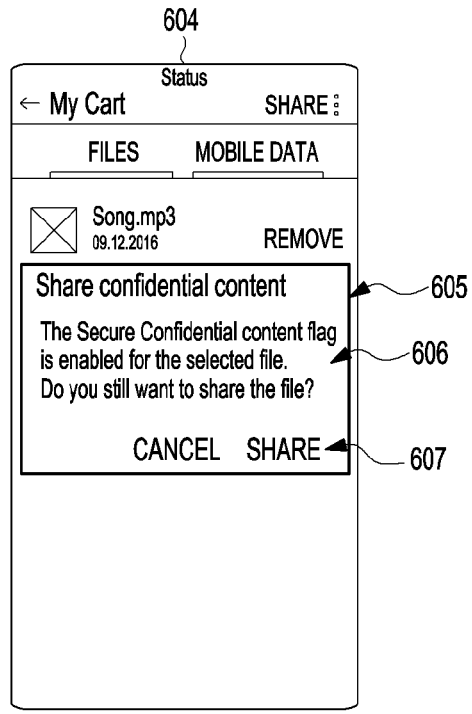
[Fig. 7a]
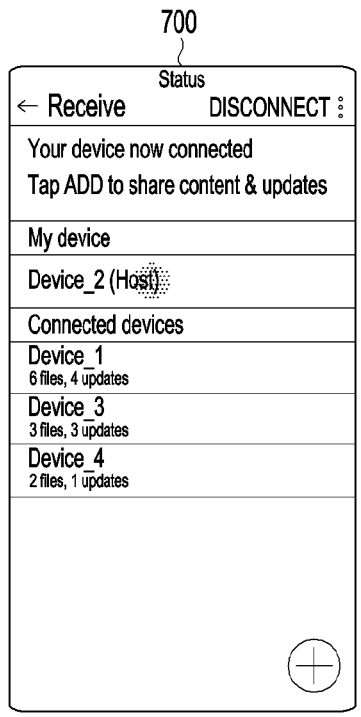

| Status | |
|---|---|
| ← Device_2 (Host) | |
| FILES | APP UPDATES |
| ⊠ Name ab.JPG<br>Galaxy S5 | 2.45 MB<br>DOWNLOAD |
| ⊠ Video song.mp3<br>Friend | 12 MB<br>DOWNLOAD |
| ⊠ 84.doc<br>A5 | 20 KB<br>DOWNLOAD |
| ⊠ IMG 2009.JPG<br>Galaxy S5 | 2.5 MB<br>DOWNLOAD |
| ⊠ BILL.MP3<br>Galaxy S5 | 200 MB<br>DOWNLOAD |
| ⊠ Abcd.pdf<br>amt | 20 KB<br>DOWNLOAD |

Status
← Preference sharing

Enabling Preference sharing would enhance bandwidth allocation to the selected device resulting in comparatively faster transfer of files and updates Connected devices

| Device_1<br>5 Mbps | ⊙⊃ |
|---|---|
| Device_3<br>5 Mbps | ⊙⊃ |
| Device_4<br>5 Mbps | ⊙⊃ |

[Fig. 7d]
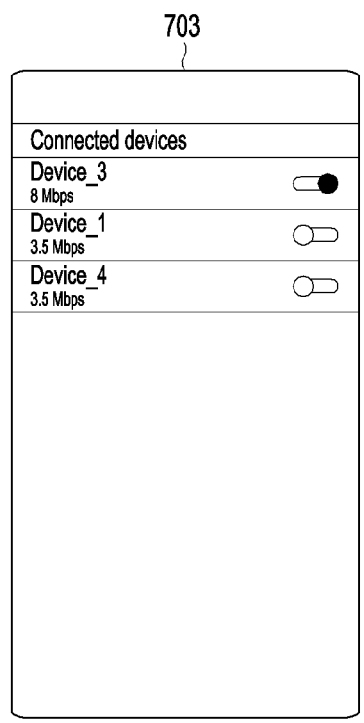

[Fig. 8]
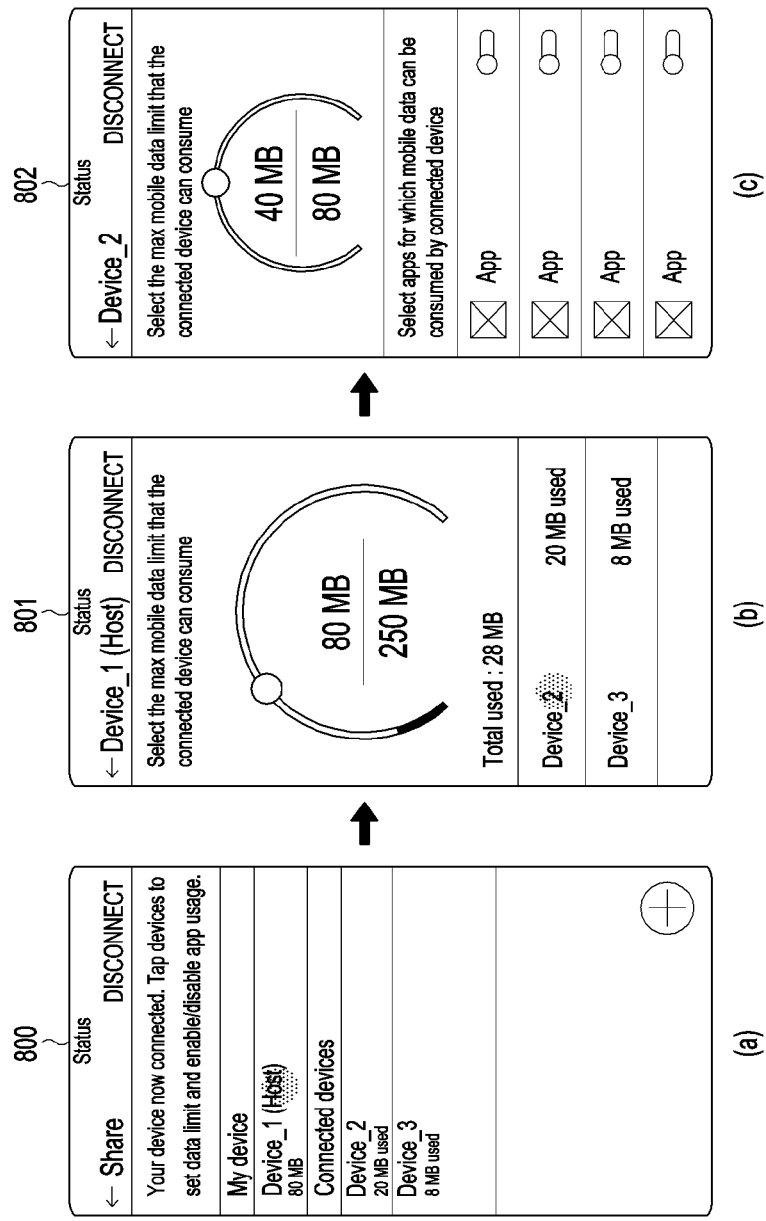

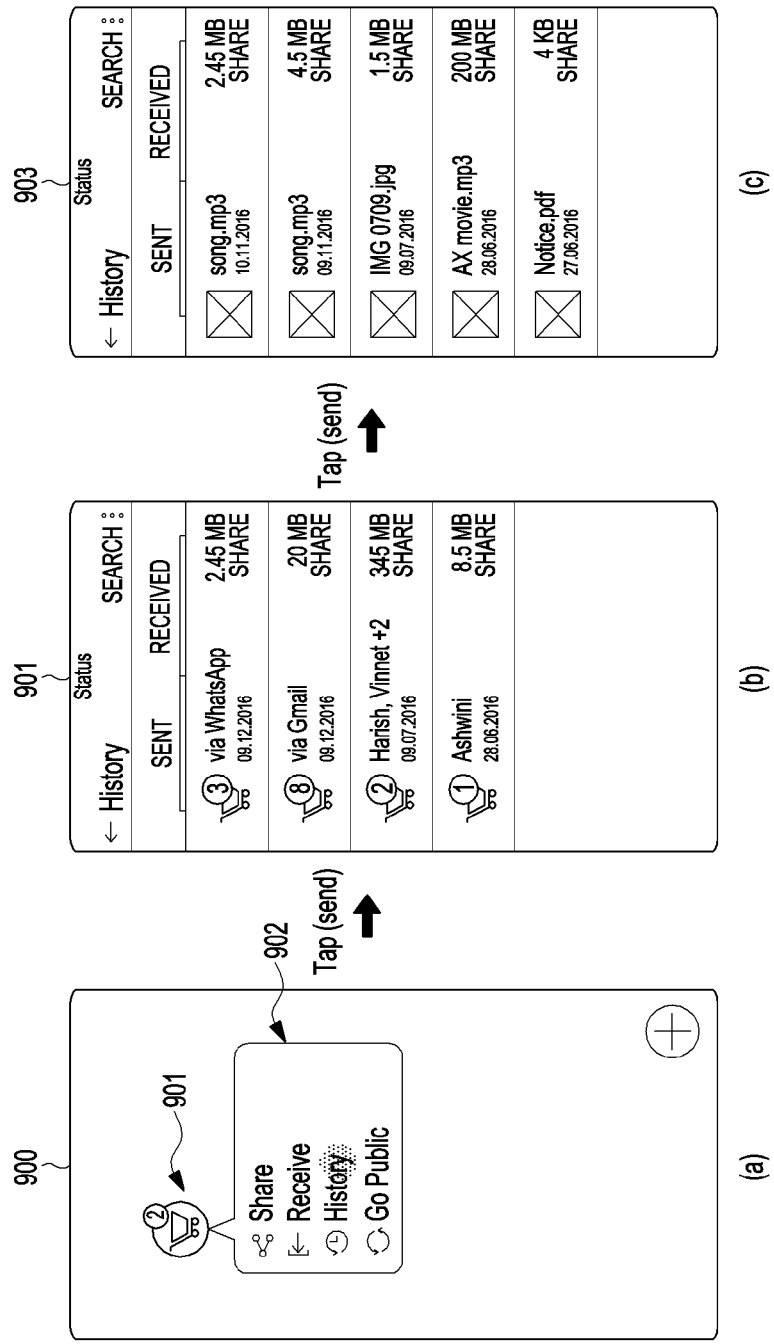
[Fig. 9]

[Fig. 10a]
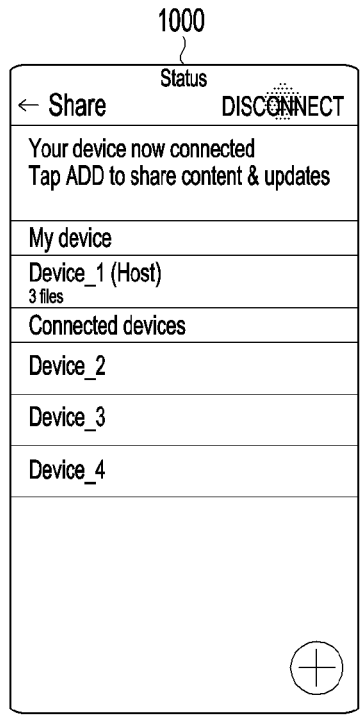
[Fig. 10b]
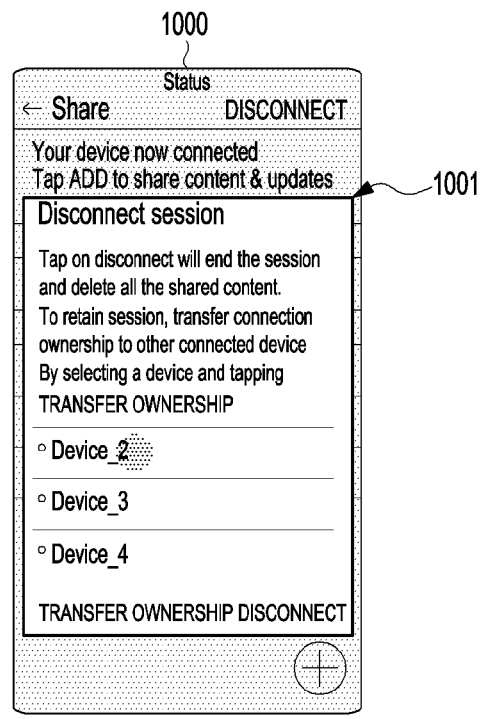

[Fig. 10c]
[Fig. 10d]
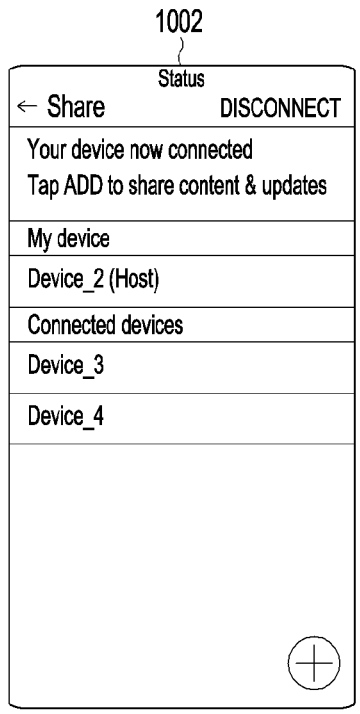

[Fig. 11a]
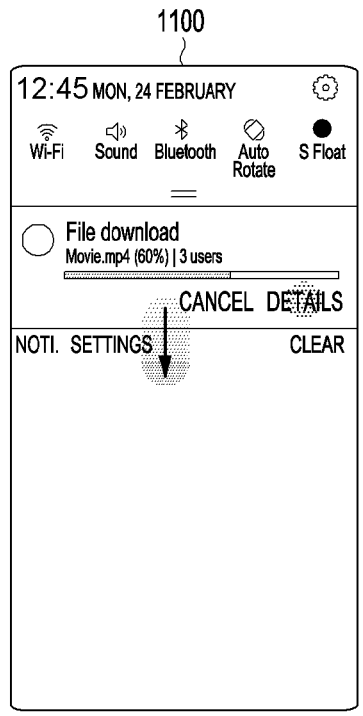
[Fig. 11b]
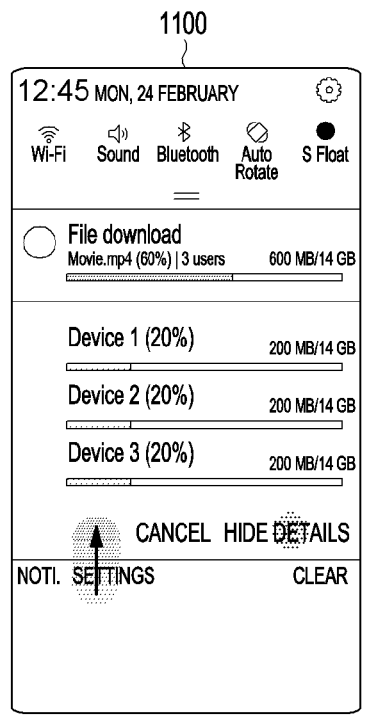

[Fig. 11c]
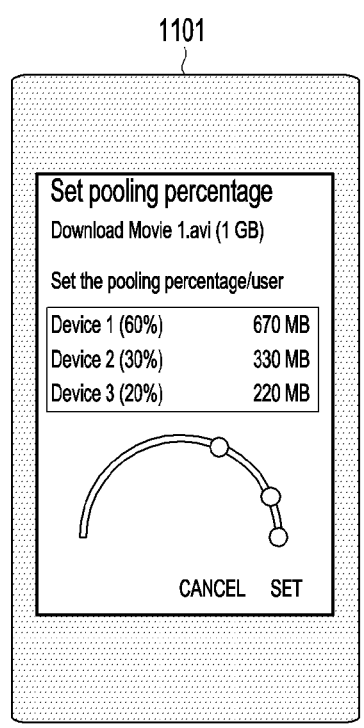

[Fig. 12]
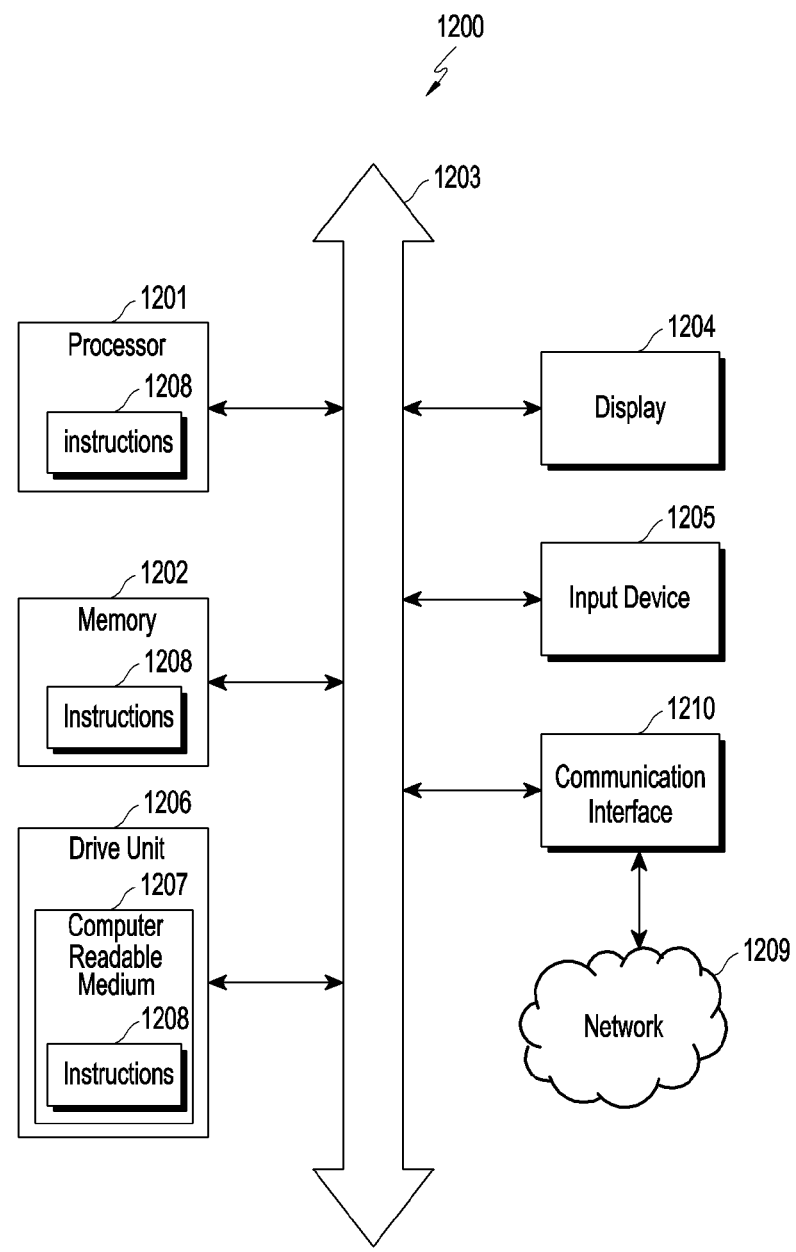

APPARATUS AND METHOD FOR SHARING CONTENT

CROSS-REFERENCE TO RELATED APPLICATION(S)

This application is a U.S. National Stage application under 35 U.S.C. § 371 of an International application filed on Dec. 12, 2018 and assigned application number PCT/KR2018/015785, which claimed the priority of a Indian patent application filed on Dec. 12, 2017 in the Indian Intellectual Property Office and assigned Serial number 201711044626, the entire disclosure of which is hereby incorporated by reference.

TECHNICAL FIELD

The present disclosure relates to an apparatus and method for sharing content.

BACKGROUND ART

With advancement in technologies, users are now able to share data such as documents, music, pictures, videos, and apps with each other through mobile devices via short-range wireless technologies such as Bluetooth, Near Field Communication (NFC) and download data on mobile devices via wireless technologies such as Wi-Fi and mobile data. However, users do not have the option to add a new data or a new user during an ongoing file transmission session. In this situation, the user has to wait for the ongoing file transfer session to finish or cancel the ongoing session and start a new one. Further, many times, a user accidentally shares text, media messages with unintended recipients that lead to several embarrassing/serious consequences depending upon the nature of the content and the person with whom it is shared. Further, it is laborious and cumbersome to create a connection using already existing applications wherein the user has to search for devices, decide to send/receive files, etc. batch-wise.

Some solutions are available that overcome the above deficiencies. In one solution, video, voice, and data are simultaneously distributed to multiple end-points over packet switching networks, compliant with the H.323 standard. A customer connecting to the H.323 compliant LAN receives a copy of datagram stream produced by a one-to-many proxy server (OTMPS). Control is granted to a customer, subject to permission by a control module, also connected to the LAN. When a customer wishes to join an ongoing agent-to-customer video, audio and data transfer session, his call made through a broadband network or through an ISDN network to the service provider, must be received there. If an ISDN has been used for access, a gateway has to be employed using as an interface between the two networks (ISDN and LAN). At this point in time, the new customer is passively connected to the customer and obtains video, audio and data like the other customers, having been connected before.

DISCLOSURE OF INVENTION

Technical Problem

However, this solution necessitates the user to make a call using a broadband network or ISDN network in order to connect with an existing connection and the connection is created using only LAN complying with H.323 standard. Once connected, only new data is shared to new device similar to existing connected devices. Further, the agent cannot decline a new user request.

Thus, there is a need for a solution which provides the user with ease of sharing content and overcomes above deficiencies.

Solution to Problem

This summary is provided to introduce a selection of concepts in a simplified format that are further described in the detailed description of the present disclosure. This summary is not intended to identify key or essential inventive concepts of the claimed subject matter, nor is it intended for determining the scope of the claimed subject matter.

In accordance with an aspect of the present disclosure, a method for sharing content in a first device is provided. The method comprises receiving a message to request to join a content sharing group from a second device while a third device included in the content sharing group transmits first content shared in the content sharing group to a fourth device included in the content sharing group, adding the second device to the content sharing group, and permitting the second device to access the first content.

In accordance with another aspect of the present disclosure, a method for sharing content in a third device is provided. The method comprises detecting a selection of first content desired to be shared in the content sharing group from a user of the third computing device while a first device included in the content sharing group transmits first content shared in the content sharing group to a second device included in the content sharing group, determining whether to share the first content in the content sharing group, and sharing the first content in the content sharing group upon determining to share the first content in the content sharing group.

In accordance with another aspect of the present disclosure, a first device is provided. The first device comprises a receiver configured to receive a message to request to join a content sharing group from a second device while a third device included in the content sharing group transmits first content shared in the content sharing group to a fourth device included in the content sharing group, and at least one processor configured to add the second device to the content sharing group, and to permit the second device to access the first content.

In accordance with another aspect of the present disclosure, a third device is provided. The third device comprises at least one processor configured to detect a selection of first content desired to be shared in the content sharing group from a user of the third computing device while a first device included in the content sharing group transmits first content shared in the content sharing group to a second device included in the content sharing group, to determine whether to share the first content in the content sharing group, and to share the first content in the content sharing group upon determining to share the first content in the content sharing group.

In accordance with another aspect of the present disclosure, the present disclosure as embodied and broadly described herein, describes for sharing content in a content sharing environment comprising a plurality of computing devices. Accordingly, in one embodiment, concurrent to an ongoing content transmission session in the content sharing environment, a host computing device in the content sharing environment receives an add request to join the content sharing environment from a further computing device. Upon receiving, the host computing device adds the further computing device to the content sharing environment and permits the further computing device to access content shared in the in the content sharing environment.

Further, the ongoing content transmission session is between a first computing device and a second computing device present in the content sharing environment. The first computing device is sending the content to the second computing device. During the ongoing content transmission session, the first computing device receives a content download request from a third computing device present in the content sharing environment. In response to the content download request, the first computing device permits the third computing device to download the content concurrent to the download by the second computing device.

In another embodiment, concurrent to an ongoing content transmission session between a first computing device and a second computing device of the content sharing environment, a third computing device receives a selection of first content to be shared in the content sharing environment from a user of the third computing device. In response, the third computing device shares the first content in the content sharing environment.

Further, prior to sharing content, a determination is made whether one or more access permissions are defined for the content. Based on the determination, a notification is provided to the user prior to sharing the content in the content sharing environment.

Further, during the ongoing content transmission session between a first computing device and a second computing device present in the content sharing environment, the first computing device upscales a bandwidth of the content transmission session based on one or more factors. The one or more factors comprise at least one of: a current ampere factor; a battery factor; a device temperature factor; a file size factor; a device core count factor; a priority request sending factor; a minimum factor; a storage factor; and a file transfer speed feedback.

The advantages of the present disclosure include, but not limited to, adding content or multiple users (i.e. devices) without interrupting an ongoing transmission session. Further, within an active or ongoing content sharing session, other devices can also be added to access a particular/ collectively shared content. Further, the user gets a seamless stress free content sharing experience since the content is shared only based on access rights. This also prevents accidental sharing of content with unintended recipients. Further, bandwidth can be efficiently managed and allocated among the connected devices in the content sharing environment during ongoing content transmission session based on various factors. This further enhances the user experience.

These aspects and advantages will be more clearly understood from the following detailed description taken in conjunction with the accompanying drawings and claims.

BRIEF DESCRIPTION OF DRAWINGS

To further clarify advantages and aspects of the present disclosure, a more particular description of the present disclosure will be rendered by reference to specific embodiments thereof, which is illustrated in the appended drawings. It is appreciated that these drawings depict only typical embodiments of the present disclosure and are therefore not to be considered limiting of its scope. The present disclosure will be described and explained with additional specificity and detail with the accompanying drawings, which are listed below for quick reference.

FIG. 1 illustrates an exemplary method for sharing content in a content sharing environment, in accordance with an embodiment of the present disclosure.

FIG. 2 illustrates an exemplary method for sharing content in a content sharing environment, in accordance with another embodiment of the present disclosure.

FIG. 3 schematically illustrates an exemplary computing device for sharing content in a content sharing environment, in accordance with embodiments of the present disclosure.

FIGS. 4a to 4c illustrate invocation of the floating container for sharing content in a content sharing environment, in accordance with the present disclosure.

FIGS. 5a to 5d illustrate example manifestation of computing device being added into the content sharing environment by a host computing device, in accordance with the present disclosure.

FIGS. 6a to 6b illustrate example manifestation of providing notification about access permissions, in accordance with the present disclosure.

FIGS. 7a to 7d illustrate example manifestation of upscaling of bandwidth, in accordance with the present disclosure.

FIG. 8 illustrates example manifestation of providing access to network data, in accordance with the present disclosure.

FIG. 9 illustrates example manifestation of transmitted content history, in accordance with the present disclosure.

FIGS. 10a to 10d illustrate example manifestation of transferring one or more control rights, in accordance with the present disclosure.

FIGS. 11a to 11c illustrate example manifestation of segmented downloading of content, in accordance with the present disclosure.

FIG. 12 illustrates a typical hardware configuration of the electronic device, in accordance with an embodiment of the present disclosure.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the present disclosure. Furthermore, the one or more elements may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

MODE FOR THE INVENTION

For the purpose of promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are exemplary and explanatory of the present disclosure and are not intended to be restrictive thereof. Throughout the patent specification, a convention employed is that in the appended drawings, like numerals denote like components.

Reference throughout this specification to "an embodiment", "another embodiment" or similar language means that a particular feature, structure, or characteristic described in connection with the embodiment is included in at least one embodiment of the present disclosure. Thus, the appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems.

Embodiments of the present disclosure will be described below in detail with reference to the accompanying drawings. Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

FIG. 1 illustrates an exemplary method 100 for sharing content in a content sharing environment, in accordance with an embodiment of the present disclosure. The content sharing environment comprises a plurality of computing devices. Herein, the content sharing environment may be a content sharing group that shares content and includes the plurality of computing devices that shares the content. Further, it will be noted that the term "computing device" may be interchangeable with the term "device", and the term "content sharing environment" may be interchangeable with the term "content sharing group".

Referring to FIG. 1, at block 101, concurrent to an ongoing content transmission session in the content sharing environment, an add request to join the content sharing environment from a further computing device is received by a host computing device.

At block 102, the further computing device is added to the content sharing environment.

At block 103, the further computing device is permitted to access content shared in the in the content sharing environment.

Further, the method 100 comprises steps to sharing content between the plurality of computing devices in the content sharing environment, prior to or subsequent to addition of the further computing device. As such, the ongoing content transmission session is between a first computing device and a second computing device present in the content sharing environment, wherein the first computing device is sending the content to the second computing device. Accordingly, the method 100 further comprises steps of: receiving, by the first computing device, a content download request from a third computing device present in the content sharing environment; and in response to the content download request, permitting the third computing device to download the content concurrent to the download by the second computing device.

Further, the method 100 comprises additional steps of: receiving, by a first computing device present in the content sharing environment, a selection of content to be shared in the content sharing environment; ascertaining whether one or more access permissions are defined for the content; and providing, based on the ascertaining, a notification to the user prior to sharing the content in the content sharing environment. The access permissions are defined by at least one of: user of one or more computing devices present in the content sharing environment and content creator.

Further, the method 100 comprises additional steps of: upscaling, by the first computing device, a bandwidth of the content transmission session based on one or more factors, the one or more factors comprising at least one of: a current ampere factor; a battery factor; a device temperature factor; a file size factor; a device core count factor; a priority request sending factor; a minimum factor; a storage factor; and a file transfer speed feedback. The upscaling of the bandwidth is performed in response to a user input of a user of at least one of the first computing device and the second computing device.

Further, the method 100 comprises additional steps of: providing, by a first computing device of the content sharing environment, access to network data to a second computing device present in the content sharing environment during the ongoing content transmission based on at least one of: (a) an application requesting access to the network data; (b) device information associated with the second computing device seeking access to the network data; (c) user-input; and (d) a predefined data limit.

Further, the method 100 comprises additional steps of: displaying, by a first computing device present in the content sharing environment, transmitted content history to a user of a first computing device, the transmitted content history being indicative of content transmitted by the first computing device; receiving, from the user, a selection of content to be transmitted to a second computing device present in the content sharing environment, the selection being done based on the transmitted content history; and transmitting the selected content to the second computing device.

Further, the method 100 comprises additional steps of: receiving, by the host computing device, a change-host request indicative of a first computing device present in the content sharing environment, the change-host request being received from one of the host computing device and the first computing device; and transferring, by the host computing device, one or more control rights of the content sharing environment to the first computing device.

Further, the method 100 comprises receiving a message to request to join a content sharing group from a second device while a third device included in the content sharing group transmits first content shared in the content sharing group to a fourth device included in the content sharing group; adding the second device to the content sharing group; and permitting the second device to access the first content.

Herein, the third device receives a content download request from a fifth device included in the content sharing group, and permits the fifth device to download the first content while the fourth device downloads the first content.

Herein, the third devices receives, from one of devices included in the content sharing group except for the third device, a message indicating selection of second content desired to be shared in the content sharing group, determines whether the second content is permitted to be shared in the content sharing group, and provides a notification indicating the determined result to the one of devices included in the content sharing group except for the third device.

Herein, the second content is shared between the third device and the one of devices included in the content sharing group except for the third device.

Herein, a bandwidth of an ongoing content transmission session is upscaled based on one or more factors, the ongoing content transmission session is used for transmitting the first content from the third device to the fourth device, and the one or more factors comprises at least one of: a current ampere factor; a battery factor; a device temperature factor; a file size factor; a device core count factor; a priority request sending factor; a minimum factor; a storage factor; and a file transfer speed feedback.

Herein, the upscaling of the bandwidth is performed according to request of at least one of the third device and the fourth device.

Herein, an access to network data is provided from the third device to the fourth device while the third device transmits the first content to the fourth device based on at least one of: (a) an application requesting the access to the network data; (b) device information associated with the fourth device seeking the access to the network data; (c) a user-input; and (d) a predefined data limit.

Herein, content history is displayed on the third device, and the content history includes information about content transmitted by the third device. Herein, a selection of content to be transmitted to the fourth device is detected by the third device, and the selection is performed based on the content history. Herein, the selected content is transmitted from the third device to the fourth device.

Herein, the method 100 further comprises detecting a message to request to change a host from the first device to the third device, and transferring one or more control rights of the content sharing group to the third device.

Further, a computing device may include at least one processor, a transmitter, a receiver, and a storage for performing the method 100.

FIG. 2 illustrates an exemplary method 200 for sharing content in a content sharing environment, in accordance with another embodiment of the present disclosure. The content sharing environment comprises a plurality of computing devices. Herein, the content sharing environment may be a content sharing group that shares content and includes the plurality of computing devices that shares the content. Further, it will be noted that the term "computing device" may be interchangeable with the term "device", and the term "content sharing environment" may be interchangeable with the term "content sharing group".

Referring to FIG. 2, at block 201, concurrent to an ongoing content transmission session between a first computing device and a second computing device of the content sharing environment, a selection of first content to be shared in the content sharing environment from a user of a third computing device is received by the third computing device. At block 202, the first content is shared in the content sharing environment.

Further, the method 200 comprises additional steps of: ascertaining, by the third computing device, whether one or more access permissions are defined for the first content; and providing, based on the ascertaining, a notification to the user prior to sharing the first content in the content sharing environment.

Further, the method 200 comprises additional steps of: receiving, by the third computing device, information associated with a second content to be downloaded; updating, by the third computing device, a list of preferred contents based on the information; and receiving, by the third computing device, a notification indicative of presence of the second content in list of preferred contents associated with one or more computing devices present in the content sharing environment.

Further, based on a user-input on the notification, the method 200 comprises additional steps of: downloading, by the third computing device, a segment of the second content; and sharing, by the third computing device, the segment of the second content with the one or more computing devices. Thereupon, the method 200 comprises additional steps of: receiving, by the third computing device, one or more segments of the second content from the one or more computing devices; and merging, by the third computing device, the one or more segments of the second content.

Further, the method 200 comprises detecting a selection of first content desired to be shared in the content sharing group from a user of the third computing device while a first device included in the content sharing group transmits first content shared in the content sharing group to a second device included in the content sharing group; determining whether to share the first content in the content sharing group; and sharing the first content in the content sharing group upon determining to share the first content in the content sharing group.

Further, the method 200 comprises providing a notification indicating the determined result. Herein, the determining whether to share the first content in the content sharing group comprises determining whether the first content is permitted to be shared in the content shared group.

Further, the method 200 comprises receiving information associated with second content to be downloaded; updating a list of contents based on the information; and receiving a notification indicating presence of the second content in the list of contents associated with one or more devices included in the content sharing group except for the third device.

Further, the method 200 comprises downloading a segment of the second content; and sharing the segment of the second content with the one or more devices included in the content sharing group except for the third device.

Further, the method 200 comprises receiving one or more segments of the second content from the one or more devices included in the content sharing group except for the third device; and merging the one or more segments of the second content.

Further, a computing device may include at least one processor, a transmitter, a receiver, and a storage for performing the method 200.

FIG. 3 schematically illustrates an example computing device 300 for sharing content in a content sharing environment, in accordance with the present disclosure. Examples of the content include, but not limited to, video, audio, image, document, multimedia, and application. The content may be stored in a memory 301 and can be accessed via native applications such as gallery and my files, and media rendering application(s) present in the computing device 300. The media items may be directly accessed over network via media streaming application(s), and browsing application(s) present in the computing device 300. As such, examples of the computing device 300 include, but not limited to, mobile devices such as smartphone, tablet, tabphones, and personal digital assistant (PDA).

In accordance with the present disclosure, the computing device 300 further comprises a display unit 302, a receiving unit 303, and a sharing control unit 304 for sharing content in the content sharing environment. The content sharing environment can be defined as cluster or group of computing devices communicatively coupled/connected with each other over a network such as Bluetooth, NFC, Wi-Fi direct, mobile data, etc. The computing devices may be connected with each other over the network in a manner as known in the art. Further, the content sharing environment includes a plurality of computing devices. Hence, all the computing devices described henceforth will have the above-mentioned units.

To create the content sharing environment, to add new devices, and to share content, the sharing control unit 304 provides a floating container on the computing device 300. The floating container provides various options for auto connection of nearby devices to form an on-the-go local/dynamic server that enables users to seamlessly share content, browse public files, and auto update apps & firmware over the air (FOTA). In one implementation, the floating container can be accessed via a quick access panel. The quick access panel provides quick access to various applications and/or functionalities available in the computing device 300. In an example, the floating container is available as an icon on the quick access panel. In another implementation, the floating container is invoked by a user-input such as shaking gesture while any screen is displayed on the display unit 302. In another implementation, the floating container is invoked by a physical contact such as tapping and bumping with another computing device while any screen is displayed on the display unit 302. This reduces the process of searching devices individually, deciding to send/receive files, etc. As would be understood, all the computing devices in the content sharing environment will have the floating container for creating the content sharing environment, adding new devices, and sharing content.

Accordingly, FIGS. 4a to 4c illustrates invocation of the floating container. Upon receiving a user-input such as shaking gesture, while the computing device 300 is in unlocked state, the floating container is invoked. Referring to FIG. 4a, a user-interface 400 includes icon 401 corresponding to the floating container. Upon receiving a further user-input on the floating container (represented by circle), various options are displayed. In one implementation, the various options are displayed in a hyperlink text format. Referring to FIG. 4b, the user-interface 400 includes the icon 401 corresponding to the floating container and options 402, i.e., share, receive, history, and go public, in the hyperlink text format are illustrated. In another implementation, the various options are displayed in an icon format. Referring to FIG. 4c, second user-interface 403 is displayed overlapping the user-interface 400. The second user-interface 403 can be a floating user-interface. The second user-interface 403 includes the icon 401 corresponding to the floating container; an icon corresponding to option receive, an icon corresponding to option history, and an icon corresponding to option go public.

In one embodiment, the computing device 300 implements the method 100 as described earlier. As such in one aspect of the embodiment, the computing device 300 can be a host computing device, which has created the content sharing environment initially by connecting with one or more computing devices. The computing device 300 can become the host computing device when the computing device 300 is configured to operate as a router or mobile "hotspot" to provide nearby computing devices with Internet access over the network, in a manner as known in the art. In another aspect of the present disclosure, the computing device 300 can be a non-host computing device or the nearby computing device added to the content sharing environment by the host computing device. As would be understood, the host computing device is capable of adding to new computing devices into the content sharing environment.

Accordingly, the receiving unit 303 of the computing device 300 (designated as host computing device) receives an add request to join the content sharing environment from a further computing device. The add request being received concurrent to an ongoing content transmission session in the content sharing environment. The further computing device may send the add request if the computing device 300 is in proximity to the further computing device. To this end, the sharing control unit 304 in the computing device 300 may broadcast a message indicating the computing device 300 is a host computing device using techniques as known in the art. As such, the sharing control unit 304 in the further computing device may search for the host computing device based on the broadcast message when the computing device 300 is in proximity to the further computing device, using techniques as known in the art.

The user of the host computing device may either accept the request or reject the request. Upon accepting the request, the sharing control unit 304 adds the further computing device to the content sharing environment and permits the further computing device to access content shared in the content sharing environment. Upon adding the further device, the sharing control unit 304 in all the computing devices provides notification regarding new inclusion of the further computing device.

In a similar manner, when any computing device disconnects from the content sharing environment, the sharing control unit 304 in all the remaining computing devices provides notification regarding disconnection of the computing device. The computing device can leave the content sharing environment when a user-input is received indicative of accessing a disconnect option. The notification can be a floating message and can be provided using techniques as known in the art.

FIGS. 5a to 5d illustrate example manifestation of computing device being added into the content sharing environment by a host computing device, in accordance with the present disclosure. Referring to FIG. 5a, a user-interface 500 of a computing device, Device_4, is illustrated. The user-interface 500 includes an icon 501 corresponding to the floating container with various options including 'receive', i.e., to connect with an existing content sharing environment. A list of host computing devices available in proximity to the computing device and is displayed upon receiving user-input indicative of accessing the 'receive' option (represented by circle). Referring to FIG. 5b, a second user-interface 502 is illustrated with a list 503 of host computing devices. For the sake of brevity only three host computing device, namely, Device_1, Device_5, and Device_6 are illustrated. An add request is sent to a host computing device, Device_1, in the list 503 upon receiving user-input indicative of connecting with the host computing device (represented by circle).

Referring to FIG. 5c, a user-interface 504 of the host computing device Device_1 is illustrated. The user-interface 504 indicates list of computing device 505 present in the content sharing environment hosted by the host computing device. The user-interface 504 also indicates request sent by the computing device, Device_4, and provides option 506 to allow the request. When the sharing control unit 304 of the host computing device, Device_1, accepts the request, the computing device, Device_4, is connected with the content sharing environment hosted by the host computing device. Accordingly, referring to FIG. 5d, a user-interface 507 is displayed indicated the host computing device, Device_1, and list of computing devices 508 present in the content sharing environment including the computing device, Device_4. For the sake of brevity only two computing devices, namely, Device_2 and Device_3 are illustrated. The user-interface 507 provides various options such as selecting content etc.

Further, upon creation of the content sharing environment, a user of any computing device can choose to share content. Accordingly, the receiving unit 302 receives a user-input indicative of accessing the 'sharing' option content from the floating container. As such, the sharing control unit 304 displays a user-interface such as user-interface 507 indicating list of computing devices present in the content sharing environment, as described earlier. Thereafter, the receiving unit 302 receives a user-input indicating selection of content. The content can be selected from the memory 301 or from a 'history' option of the floating container. Upon selecting the content, the content is added to a database of the floating container. In an example, the database can be internal to each computing device but added content is visible to all computing devices as a snapshot. Thereafter, the receiving unit 302 receives a user-input indicating 'device selection' option to share the content. Accordingly, the sharing control unit 304 displays a list of computing devices present in the content sharing environment and optionally a list of computing devices present in proximity of the computing device 300. The receiving unit 302 receives a further user-input indicating selection of device(s) from the displayed list. Upon receiving the further user-input, the sharing control unit 304 shares the selected content with the selected device(s) via any mechanism such as Bluetooth, NFC, Wi-Fi direct, etc.

Further, a user of any computing device can choose to share content or choose to remove some shared content which were not meant to be shared during an ongoing content transmission session. Thus, during an on-going content transmission session between any computing devices, any computing device (whether designated as host computing device or not) can request for downloading content.

Accordingly, the receiving unit 303 of the computing device (designated either as host computing device or non-host computing device) further receives a content download request from the further computing device during the ongoing content transmission session between the computing device 300 and another computing device (hereinafter referred to as second computing device for the sake of clarity) present in the content sharing environment. The sharing control unit 304 permits the further computing device to download the content concurrent to the ongoing content transmission session in response to the content download request.

Further, whenever new content is added or removed by any computing device, other computing devices are notified visually by a notification icon representing that some changes have occurred. Upon receiving a user-input indicative of accessing the notification icon, the latest content is displayed. In addition, each of computing devices is aware of all computing devices present in the content sharing environment and there might also private connections between all the computing devices. As such, user of any computing device at any time can choose to add or remove files shared with any other computing device.

Further, prior to sharing content, one or more access permissions can be defined. The access permissions prevent sharing of content with unintended recipients. In an implementation, the access permissions are defined by a content creator. In such implementation, the sharing control unit 304 does not perform any further action. In another implementation, the access permissions are defined by user of one or more computing devices present in the content sharing environment. In such implementation, the sharing control unit 304 extracts keywords from the content and creates tags based on the extracted keywords using techniques as known in the art. Examples of such techniques include but not limited to image/video processing techniques, audio processing techniques, and document processing techniques. Upon creation of tags, the sharing control unit 304 suggests the tags to the user to define access permissions. Upon receiving a user-input, the sharing control unit 304 embeds the tags in the content and stores such content in the memory 301. Additionally, the access permissions are mapped with the tags and the mapping is stored in the memory 301. In an example, the content can be text and image shared between user A and user B via a chat application. As such, tags can be identified for the image as sender name (i.e., user A), recipient name (i.e., user B), and private chat. Consequently, the access permissions can be defined as 'allow sending of image to user B' and/or 'prevent sending of image to any user other than user B'.

Thereafter, the receiving unit 303 receives a selection of content to be shared in the content sharing environment. In response, the sharing control unit 304 ascertains/determines whether one or more access permissions are defined for the content. To this end, the sharing control unit 304 determines if tags are embedded in the content and determine the access permissions based on the mapping stored in the memory 301. Based on the ascertaining, the sharing control unit 304 provides a notification to the user on the display unit 302 prior to sharing the content in the content sharing environment.

FIGS. 6a to 6b illustrates example manifestation of providing notification about access permissions, in accordance with the present disclosure. Referring to FIG. 6a, a user-interface 600 is displayed during the selection of content for sharing. The sharing control unit 304 provides a notification 601 to receive user-input for defining access permissions for the content. The notification 601 can be a floating message. The notification 601 includes a text portion 602 to indicating access permissions and user-task 603. Upon receiving user-input indicative of selecting the user-task 603 to define the access permission, the sharing control unit 304 defines the access permission as described earlier.

Referring to FIG. 6b, a user-interface 604 is displayed during sharing of content. The sharing control unit 304 provides a notification 605. The notification 605 includes a text portion 606 indicates access permissions are defined and user-task 607 to share the content. Upon receiving user-input indicative of selecting the user-task 607, the content is shared.

Further, during the ongoing content transmission session between the computing device 300 and further computing device, the computing device 300 can upscale the bandwidth of the content transmission session based on one or more factors. As would be understood, upscaling of the bandwidth indicates increasing speed of sharing (or transferring) the content. The one or more factors comprise at least one of: a current ampere factor; a battery factor; a device temperature factor; a file size factor; a device core count factor; a priority request sending factor; a minimum factor; a storage factor; and a file transfer speed feedback.

1. Current Ampere Factor [A] is directly proportional ($\propto$) to Transfer Speed: It is factor by which battery is charging/ discharging. The range will be taken between −500 mAh to +500 mAh. Readings less than −500 mAh will be given −500 mAh value and readings greater than +500 mAh will be given +500 mAh value. The Current Ampere factor[A] will be calculated as:

$A=((\text{Device current reading}-(-500))/(500-(-500)))*(20-0)$

2. Battery Factor [B] ∝ Transfer Speed: This factor takes into account the battery percentage of the device. Minimum value of 8 is given to each device. Then battery factor is calculated and added to minimum value. Battery percentage less than 15 will be considered 0 and battery percentage greater than 90 will be considered as 90. Battery factor [B] will be calculated as:

$B=((\text{Device battery percentage}-15)/(90-15))*(20-8)+8$

3. Device Temperature Factor [T] ∝ 1/Transfer Speed: This factor takes into account the device temperature. Minimum value of 2 is given to each device. Then device temperature is calculated and added to minimum value. Device temperature less than 10 will be considered 10 and device temperature greater than 50 will be considered as 50. Device temperature factor[D] will be calculated as:

$T=((50-\text{Device temperature})/(50-10))*(10-2)+2$

4. File Size Factor [F] ∝ Transfer Speed: This factor takes into account the file size that is being sent. If file size is large then transfer speed is increased in order to send the file in less time so that file is sent completely even if device gets disconnected mistakenly. File size less than 1 MB will be considered 1 MB and file size greater than 1500 MB will be considered as 1500 MB. File Size Factor [F] will be calculated as:

$F=((\text{File size}-1)/(1500-1))*(15-0)$

5. Device Core count Factor [C] ∝ Transfer Speed: This factor takes into account the device core count. Minimum value of 8 is given to each device corresponding to single core. Then device core count factor is calculated and added to minimum value. Device cores greater than 8 will be considered as 8. Device temperature factor[D] will be calculated as:

$C=((\text{No. of cores}-1)/(8-1))*(20-8)+8$

6. Priority Sending request Factor [P] ∝ Transfer Speed: The receiver can request for priority sending explicitly. If sender accepts the request priority sending request factor [P] is set as 15.

7. Minimum Factor [S]: A minimum factor of 50 is assigned to each device to guarantee minimum transfer rate.
General Formula for A, B, F, C:

Factor=((Device Reading−MinVal)/(MaxVal−MinVal))*(MaxWeight−MinWeight)+MinWeight Total BAF=Minimum Factor+$A+B+T+F+C+P$ 8. Storage: If storage becomes less than the file we have requested, that file will automatically be skipped and user will be intimated to create more room for that file. Next file if can be accommodated will start to download automatically.

9. File Transfer Speed feedback: If transfer speed of any ongoing session is increased by say increasing buffer size, feedback is checked. If the transfer speed increased from before then only the buffer size is increased else if the speed remains same or decreases then buffer size is returned to pre-set size. This can happen if the receiving device is already performing on its optimum level.

The upscaling of the bandwidth is performed in response to a user input of a user of at least one of the computing device 300 and the further computing device. The receiving unit 303 receives the user-input or the request from the further computing device. Upon receiving, the sharing control unit 304 determines the above mentioned factors for the computing device 300 (hereinafter referred to as factor-I for sake of clarity). Likewise, the sharing control unit 304 in the further computing device determines the above mentioned factors for the further computing device (hereinafter referred to as factor-II for sake of clarity) and share the factor-II with the computing device 300. The receiving unit 303 receives the factor-II and passes to the sharing control unit 304 for calculation of upscaling factor. The sharing control unit 304 calculates the upscaling factor by giving different weightage to different components in the factor-I and factor-II. Thereafter, the sharing control unit 304 calculates a priority factor according to the upscaling factor. The sharing control unit 304 then updates a thread for the further computing device so that content sending throughput can be increased/decreased accordingly. The throughput is also updated by changing the buffer size of a write thread of the computing device 300 so that content can be sent in single buffer. The sharing control unit 304 also shares the priority factor and buffer size to the further computing device for updating.

In a similar manner, the sharing control unit 304 can upscale bandwidth of any content transmission session with one computing device amongst plurality of content transmission sessions with plurality of computing devices. To this end, the sharing control unit 304 receives the factor-II from each of the plurality of computing devices in a manner as described earlier. The sharing control unit 304 then determines the priority factor for each of the threads such that minimum best possible bandwidth is allocated to remaining computing devices. Additionally, the sharing control unit 304 can upscale bandwidth or determines the priority factor every time a new computing device is added to the content sharing environment or existing computing device is removed from the content sharing environment.

FIGS. 7a to 7d illustrate example manifestation of upscaling of bandwidth, in accordance with the present disclosure. Referring to FIG. 7a, a user-interface 700 of a host computing device, Device_2, is illustrated. The user-interface 700 is similar to the user-interface 507 as described in reference to FIG. 5. The user-interface 700 indicates the host computing device, Device_2, and list of computing devices present in the content sharing environment. For the sake of brevity only three devices, Device_1, Device_3, and Device_4 are illustrated. Upon selecting the host computing device, Device_2, (represented by circle), a second user-interface 701 is displayed, as illustrated in FIG. 7b. The second user-interface 701 indicates the content being shared with the computing devices present in the content sharing environment. Upon receiving a user-input indicative of upscaling the bandwidth (represented by circle), a third user-interface 702 is displayed, as illustrated in FIG. 7c. The third user-interface 702 indicates the computing devices present in the content sharing environment with which the content is being shared. In addition, the third user-interface 702 displays a bandwidth allocated to each of computing devices. Prior to upscaling of bandwidth, each of the computing devices is allotted same amount of bandwidth, i.e., 5 Mbps. Upon receiving a user-input indicative of selecting the device, Device_3, (represented by circle), the bandwidth allotted for content transmission is increased for Device-3, and minimal optimum bandwidth is allotted for remaining devices, as indicated in fourth user-interface 703 illustrated in FIG. 7d. Upon upscaling, Device_3 is allotted 8 Mbps while each of the Device_1 and Device_4 is allotted 3.5 Mbps as minimal optimum bandwidth.

Further, during the ongoing content transmission between the computing device 300 and a second computing device, the computing device 300 can provide access to network data to the second computing device based on at least one of:

(a) an application requesting access to the network data;
(b) device information associated with the second computing device seeking access to the network data;
(c) user-input; and
(d) a predefined data limit.

Similarly, the computing device 300 can provide access to network data to any computing device amongst plurality of computing devices currently in plurality of content transmission sessions with the computing device 300. This enables user of the computing device 300 to selectively share (quantify) data to be shared with individual (or collective) devices and monitor information consumed, content accessed, apps/services used. For example, 'X MB' data can be shared with a device for using only 'Y' application.

To this end, the receiving unit 303 receives user-input indicative of selection of the device(s) and amount of network data to be allocated to the selected device(s). The selected device(s) include the second computing device. In addition, the receiving unit 303 receives user-input indicative of selection of application(s) for which data is to be restricted or consumed by the selected device(s). Upon receiving the user-input, the sharing control unit 304 updates data limit of the computing device 300 and selected application(s). The sharing control unit 304 further transmits data policy and application restricted policy (hereinafter interchangeably referred to as policies) with the selected device(s). The data policy includes information about amount of data being shared. The application restricted policy includes information about the selected application(s). In one implementation, the sharing control unit 304 transmits the policies via the connection established between the computing device 300 and the selected device(s) in the content sharing environment. In one implementation, the sharing control unit 304 transmits the policies via a transmission mechanism. The transmission mechanism can be one of a data sharing application such as messaging application and email application, online storage application, and communication mechanisms such as Wi-Fi direct and Bluetooth. In such implementation, the receiving unit 303 receives a further user-input indicative of selection of transmission mechanism.

Upon transmitting the policies, the receiving unit 303 of the selected device(s) receive the data policy and application restricted policy. Consequently, the sharing control unit 304 of the selected device(s) applies the policies. As such, the sharing control unit 304 may restrict further data usage of the selected device(s) when the amount of data consumed exceeds the amount of data indicated in the data policy. Likewise, the sharing control unit 304 may restrict further data usage by the selected application(s) when the amount of data consumed exceeds the amount of data indicated in the application restricted policy. When the computing device 300 disconnects from the content sharing environment, the data policy and application restricted policy are saved in the memory 301 for future reference.

FIG. 8 illustrates example manifestation of providing access to network data, in accordance with the present disclosure. Referring to (a) in FIG. 8, a user-interface 800 of a host computing device, Device_1, is illustrated. The user-interface 800 is similar to the user-interface 507 as described in reference to FIG. 5. The user-interface 800 indicates the host computing device, Device_2, and list of computing devices present in the content sharing environment. For the sake of brevity only two devices, Device_2 and Device_3 are illustrated. Upon selecting the host computing device, Device_1, (represented by circle), a second user-interface 801 is displayed, as illustrated in (b) in Figure. The second user-interface 801 indicates total amount of data, i.e., 250 MB available for the host computing device, Device_1, and amount of data, i.e., 80 MB to be sent by the host computing device, Device_1. The second user-interface 801 also indicates amount of data used by Device_2 and Device_3. Upon receiving a user-input indicative of selecting the Device_2 (represented by a circle) for providing network data, a third user-interface 802 is displayed, as illustrated in (c) in FIG. 8. The third user-interface 802 indicates maximum amount of data, i.e., 801\4B, which can be consumed by the Device_2. The data can be limited to 40 MB for use by the Device_2 (represented by circle in the arc).

Further, as described earlier, content for sharing between computing devices can be selected from a transmitted content history stored in the memory. The transmitted content history is indicative of content shared/transmitted and received by the computing device 300 with one or more computing devices in the content sharing environment. The transmitted content history includes name of content, type of content, memory space required/used by the content, type of application/transmission mechanism through which the content was shared, type of application/transmission mechanism through which the content was received, and the device with which the content was shared. The sharing control unit 304 of the computing device 300 updates the transmitted content history after every the content is shared. For sharing content from the transmitted content history, the sharing control unit 304 displays the transmitted content history on the display unit 302 upon receiving a corresponding user-input.

The receiving unit 303 of the computing device 300 receives a selection of content to be transmitted with a second computing device from the transmitted content history in a manner as described earlier. Additionally, content can be searched and sorted in the transmitted content history in a manner as known in the art. Upon receiving the user-input, the sharing control unit 304 shares/transmits the content with the second computing device in a manner as described earlier.

FIG. 9 illustrates example manifestation of transmitted content history, in accordance with the present disclosure. Referring to (a) in FIG. 9, a user-interface 900 is illustrated of a computing device. The user-interface 900 includes the icon 901 corresponding to the floating container and options 902, i.e., share, receive, history, and go public are illustrated. Upon selecting the option 'history', (represented by circle), a second user-interface 903 is displayed, as illustrated in (b) in FIG. 9. The second user-interface 903 indicates content shared/transmitted by the computing device with one or more computing devices in the content sharing environment under heading 'SENT'. Likewise, as illustrated in (c) in FIG. 9, the second user-interface 903 indicates content received by the computing device from the one or more computing devices in the content sharing environment under heading 'RECEIVED'

Further, the host computing device can transfer one or more control rights to a first computing device present in the content sharing environment. The control rights include, but not limited to, adding/removing new computing device in the content sharing environment. Accordingly, the receiving unit 303 of the computing device 300, designated as the host computing device, receives a change-host request. The change-host request is indicative of transferring one or more control rights to the first computing device. The change-host request can be received as user-input on the host computing device or can be received from the first computing device. In response, the sharing control unit 304 transfers the one or more control rights to the first computing device. To this end, the sharing control unit 304 transmits the details of the first computing device with each of the plurality of computing devices in the content sharing environment. Thereafter, the sharing control unit 304 disconnects from the content sharing environment and turns off the hotspot. The sharing control unit 304 of the first computing device turns on the hotspot. The plurality of computing devices save device state, disconnect from the hotspot created by the original host computing device, and connect with the hotspot created by the first computing device.

FIGS. 10*a* to 10*d* illustrate example manifestation of transferring one or more control rights, in accordance with the present disclosure. Referring to FIG. 10*a*, a user-interface 1000 of a host computing device, Device_1, is illustrated. The user-interface 1000 is similar to the user-interface 507 as described in reference to FIG. 5. The user-interface 1000 indicates the host computing device, Device_1, and list of computing devices present in the content sharing environment. For the sake of brevity only three devices, Device_2, Device_3, and Device_4 are illustrated. Upon selecting the 'disconnect' option (represented by circle), a notification 1001 is displayed on the user-interface 1000, as illustrated in FIG. 10*b*. The notification 1001 indicates text message regarding the disconnection and provides the list of computing devices for transferring one or more control rights. A user-input indicative of selecting the Device_2 (represented by circle) is received on the user-interface 1000. Upon receiving user-input indicative of selecting option 'transfer ownership' (represented by circle) on the user-interface 1000, a second user-interface 1002 is displayed, as illustrated in FIG. 10*d*. The second user-interface 1002 is similar to the user-interface 507 as described in reference to FIG. 5. The second user-interface 1002 indicates the new host computing device, Device_2, and list of computing devices, i.e., Device_3 and Device_4, present in the content sharing environment.

In accordance with another embodiment, the computing device 300 implements the method 200 as descried earlier. As such, upon creation of the content sharing environment, and concurrent to an ongoing content transmission session between a first computing device and a second computing device, the receiving unit 304 receives a selection of a first content to be shared, in a manner as described earlier. Upon receiving the selection, the sharing control unit 304 shares the first content in the content sharing environment, in a manner as described earlier.

Further, the receiving unit 304 of the computing device 300 receives information associated with a second content to be downloaded via media streaming application(s) or browser application(s) over a network. The receiving unit 304 receives the information from the media streaming application(s) or browser application(s). Upon receiving, the sharing control unit 304 of the computing device 300 updates a list of preferred contents stored in the memory 301. Thereafter, the receiving unit 303 receives a notification indicative of presence of the second content in list of preferred contents associated with one or more computing devices present in the content sharing environment and in proximity with the computing device 300.

Subsequently, the receiving unit 303 receives user-input from the one or more computing devices to download the content by distributing the content to be downloaded. Accordingly, the sharing unit 304 of the computing device 300 creates a peer-to-peer connection with each of the one or more computing devices and downloads a segment of the second content from the network. Upon downloading, the sharing control unit 304 shares the segment of the second content with the one or more computing devices. In a similar manner, the sharing control unit 304 in the one or more computing devices downloads segments of the second content from the network and shares the segments with the computing device 300. Accordingly, the receiving unit 303 of the computing device 300 receives the segments. Upon receiving, the sharing control unit 304 of the computing device 300 merges the segments to form the complete content.

FIGS. 11*a* to 11*c* illustrate example manifestation of segmented downloading of content, in accordance with the present disclosure. Referring to FIG. 11*a*, a user-interface 1100 of a computing device, Device_1, is illustrated. The user-interface 1100 indicates a file being downloaded from a server over a network. Referring to FIG. 11*b*, the user-interface 1100 further indicates all the devices, Device_1, Device_2 and Device_3 downloading the file in segments, as described earlier. Referring to FIG. 11*c*, a second user-interface 1101 is illustrated that enables setting of data limit for each of the computing devices, as described earlier.

Further, the computing device 300 can provide access to the memory 301 to a second computing device present in the content sharing environment based on at least one of:

(a) device information associated with the second computing device seeking access to the memory; and (b) user-input.

This enables sharing of memory (space) between nearby computing devices in a secured way and enable access of the memory seamlessly. In an implementation, the contents are automatically pushed to the computing device 300 (based on the calculation done by the device that it might run out of memory space) to enhance the performance of the second computing device. In another implementation, the contents are downloaded onto a wearable device connected with the computing device 300.

In one aspect, the receiving unit 303 of the computing device 300 receives the device information from the second computing device. The device information includes amount of memory space required by the second computing device. In an example, the device information can be received when the sharing control unit 304 of the second computing device determines the memory space is full. In another example, the device information can be received when the sharing control unit 304 of the second computing device determines the memory space is full while downloading content over a network. In another aspect, the receiving unit 303 of the computing device 300 receives the user-input via the floating container on the computing device 300. Upon receiving, the sharing control unit 304 of the computing device 300 share the amount of memory space with the second computing device. Thus, the content being stored in the second computing device will now be stored in the memory 301 of the computing device 300. Furthermore, the contents are pushed in an encrypted format in the memory 301 of the computing device 300 which are accessible only by the content owner(s).

Further, in accordance with the present disclosure, a physical contact between the computing device 300 and any other computing device within the content sharing environment enables previewing of files, saving data/memory, thereby enhancing experience. The physical contact can be tapping and bumping. This reduces the process of searching devices individually, and sending or receiving files. A preview mode can also be seen in wearable devices communicatively coupled with the computing device 300 and any other computing device. For example, music files can be heard from the receiver's headset and then decided to download from the sender. Examples of the wearable devices include but not limited to smart watches, smart glasses, fitness gears, and activity trackers.

Further, in accordance with the present disclosure, push notifications to the wearable devices can be sent when the wearable devices are in proximity to the computing device 300. For example, music files which are previewed from the receiver's headset could then be downloaded from the sender to the receiver's mobile music storage device directly or re-directed to be downloaded to a different wearable device based on machine learning.

Thus, the present disclosure enables sharing of data, memory securely among a cluster or group of connected devices forming a content sharing environment in a more efficient (dynamic bandwidth allocation) and effective (content tagging) manner. Further, the present disclosure provides a system to be used by user in one-to-many/many-to-many transmission of content which can be heterogeneous, pre-collected, pre-shared or any combination thereof.

Further, the computing device 300 may include a processor for performing necessary functions of the device as known in the art. In one implementation, the functionalities of the units, i.e., the receiving unit 303 and the sharing control unit 304, as described above may be implemented by way of updating a framework of the computing device 300. In one implementation, the above described units can be implemented as a software module such as mobile-based application. The application can be pre-loaded or can be downloaded onto the computing device 300. In one implementation, the above described units can be implemented as a module that is a combination of software and hardware modules. In one implementation, one or more of the above described units can be implemented as an integral part of the processor. In one implementation, the above described units can be implemented external to the processor.

Although specific modules have been illustrated in the figure and described above, it should be understood that the computing device 300 may include other hardware modules or software module or combinations as may be required for performing various functions.

FIG. 12 illustrates a typical hardware configuration of the computing device 300 in the form of a computer system 1200 is shown. The computer system 1200 can include a set of instructions that can be executed to cause the computer system 1200 to perform any one or more of the methods disclosed. The computer system 1200 may operate as a standalone device or may be connected, e.g., using a network, to other computer systems or peripheral devices.

In a networked deployment, the computer system 1200 may operate in the capacity of a server or as a client user computer in a server-client user network environment or master-slave network environment, or as a peer computer system in a peer-to-peer (or distributed) network environment. The computer system 1200 can also be implemented as or incorporated into various devices, such as a personal computer (PC), a tablet PC, a set-top box (STB), a personal digital assistant (PDA), a mobile device, a palmtop computer, a laptop computer, a desktop computer, or any other machine capable of executing a set of instructions (sequential or otherwise) that specify actions to be taken by that machine. Further, while the single computer system 1200 is illustrated, the term "device" shall also be taken to include any collection of systems or sub-systems that individually or jointly execute a set, or multiple sets, of instructions to perform one or more computer functions.

The computer system 1200 may include a processor 1201, e.g., a central processing unit (CPU), a graphics processing unit (GPU), or both. The processor 1201 may be a component in a variety of systems. For example, the processor 1201 may be part of a standard personal computer or a workstation. The processor 1201 may be one or more general processors, digital signal processors, application specific integrated circuits, field programmable gate arrays, servers, networks, digital circuits, analog circuits, combinations thereof, or other now known or later developed devices for analysing and processing data The processor 1201 may implement a software program, such as code generated manually (i.e., programmed).

The computer system 1200 may include a memory 1202, such as the memory 202 that can communicate via a bus 1203. The memory 1202 may be a main memory, a static memory, or a dynamic memory. The memory 1202 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 1202 includes a cache or random access memory for the processor 1201. In alternative examples, the memory 1202 is separate from the processor 1201, such as a cache memory of a processor, the system memory, or other memory. The memory 1202 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1202 is operable to store instructions executable by the processor 1201. The functions, acts or tasks illustrated in the figures or described may be performed by the programmed processor 1201 executing the instructions stored in the memory 1202. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1200 may further include a display unit 1204, such as a liquid crystal display (LCD), an organic light emitting diode (OLED), a flat panel display, a solid state display, a cathode ray tube (CRT), a projector, a printer or other now known or later developed display device for outputting determined information. The display unit 1204 may act as an interface for the user to see the functioning of the processor 1201, or specifically as an interface with the software stored in the memory 1202 or in a drive unit 1206.

The computer system 1200 may also include a disk or optical drive unit 1206. The disk drive unit 1206 may include a computer-readable medium 1207 in which one or more sets of instructions 1208, e.g. software, can be embedded. Further, the instructions 1208 may embody one or more of the methods or logic as described. In a particular example, the instructions 1208 may reside completely, or at least partially, within the memory 1202 or within the processor 1201 during execution by the computer system 1200. The processor 1201 and the memory 1202 may also include computer-readable media as discussed above.

The present disclosure contemplates a computer-readable medium that includes instructions 1208 or receives and executes instructions 1208 responsive to a propagated signal so that a device connected to a network 1209 can communicate voice, video, audio, images or any other data over the network 1209. Further, the instructions 1208 may be transmitted or received over the network 1209 via a communication port or interface 1210 or using the bus 1203. The communication port or interface 1210 may be a part of the processor 1201 or may be a separate component. The communication port 1210 may be created in software or may be a physical connection in hardware. The communication port 1210 may be configured to connect with the network 1209, external media, the display unit 1204, or any other components in computer system 1200, or combinations thereof. The connection with the network 1209 may be a physical connection, such as a wired Ethernet connection or may be established wirelessly as discussed later. Likewise, the additional connections with other components of the computer system 1200 may be physical connections or may be established wirelessly. The network 1209 may alternatively be directly connected to the bus 1203.

The network 1209 may include wired networks, wireless networks, Ethernet AVB networks, or combinations thereof. The wireless network may be a cellular telephone network, an 802.11, 802.16, 802.20, 802.1Q or Wi Max network. Further, the network 1209 may be a public network, such as the Internet, a private network, such as an intranet, or combinations thereof, and may utilize a variety of networking protocols now available or later developed including, but not limited to TCP/IP based networking protocols.

Additionally, the computer system 1200 may include an input device 1205 configured to allow a user to interact with any of the components of computer system 1200. The input device 1205 may be a number pad, a keyboard, or a cursor control device, such as a mouse, or a joystick, touch screen display, remote control or any other device operative to interact with the computer system 1200.

According to an embodiment of the present disclosure, a computing device for sharing content in a content sharing environment is provided. Herein, the content sharing environment comprises a plurality of computing devices, and the computing device comprises:

a receiving unit to receive an add request to join the content sharing environment from a further computing device, the add request being received concurrent to an ongoing content transmission session in the content sharing environment; and a sharing control unit to:

add the further computing device to the content sharing environment; and permit the further computing device to access content shared in the in the content sharing environment.

Herein, the receiving unit further receives a content download request from the further computing device during the ongoing content transmission session between the computing device and another computing device present in the content sharing environment, and the sharing control unit permits the further computing device to download the content concurrent to the ongoing content transmission session in response to the content download request.

Herein, the receiving unit further receives a selection of content to be shared in the content sharing environment; and
the sharing control unit further:
ascertains whether one or more access permissions are defined for the content; and
provides a notification to a user prior to sharing the content in the content sharing environment based on the ascertaining.

Herein, the sharing control unit further:
upscales a bandwidth of the ongoing content transmission session based on one or more factors, the one or more factors comprising at least one of:
a current ampere factor;
a battery factor;
a device temperature factor;
a file size factor;
a device core count factor;
a priority request sending factor;
a minimum factor;
a storage factor; and
a file transfer speed feedback.

According to an embodiment of the present disclosure, a computing device for sharing content in a content sharing environment is provided. Herein, the content sharing environment comprises a plurality of computing devices, and the computing device comprising;

a receiving unit to receive a selection of content to be shared in the content sharing environment from a user of the computing device, the selection being received concurrent to an ongoing content transmission session between a first computing device and a second computing device present in the content sharing environment; and a sharing control unit to share the content in the content sharing environment.

Herein, the sharing control unit further:
ascertains whether one or more access permissions are defined for the content; and
provides a notification to the user prior to sharing the content in the content sharing environment.

In an alternative example, dedicated hardware implementations, such as application specific integrated circuits, programmable logic arrays and other hardware devices, can be constructed to implement various parts of the computer system 1200. Applications that may include the systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof. It may be noted that the method as described in the present disclosure can be implemented in a wide variety of electronic devices including but not limited to desktop computers, lap top computers, palm top computers, tabs, mobile phones, televisions, etc. Also, the user input can be received by the system using a wide variety of techniques including but not limited to using a mouse, a gesture input, a touch input, a stylus input, a joy stick input, a pointer input, etc.

While certain present preferred embodiments of the disclosure have been illustrated and described herein, it is to be understood that the present disclosure is not limited thereto. Clearly, the present disclosure may be otherwise variously embodied, and practiced within the scope of the following claims.

The invention claimed is:

1. A method for sharing content in a first device, the method comprising:
    receiving a message to request to join a content sharing group from a second device while a third device included in the content sharing group transmits first content shared with the content sharing group to a fourth device included in the content sharing group;
    adding the second device to the content sharing group; and
    permitting the second device to access the first content,
    wherein the third device receives, from one of devices included in the content sharing group except for the third device, a message indicating selection of second content desired to be shared with the content sharing group, determines whether the second content is permitted to be shared with the content sharing group, and
    wherein the third device provides a notification indicating the determined result to the one of devices included in the content sharing group except for the third device.

2. The method as claimed in claim 1,
    wherein the third device receives a content download request from a fifth device included in the content sharing group, and
    wherein the third device permits the fifth device to download the first content while the fourth device downloads the first content.

3. The method as claimed in claim 1, wherein the second content is shared between the third device and the one of devices included in the content sharing group except for the third device.

4. The method as claimed in claim 1,
    wherein a bandwidth of an ongoing content transmission session is upscaled based on one or more factors,
    wherein the ongoing content transmission session is used for transmitting the first content from the third device to the fourth device, and
    wherein the one or more factors comprises at least one of:
        a current ampere factor;
        a battery factor;
        a device temperature factor;
        a file size factor;
        a device core count factor;
        a priority request sending factor;
        a minimum factor;
        a storage factor; or
        a file transfer speed feedback.

5. The method as claimed in claim 4, wherein the upscaling of the bandwidth is performed according to request of at least one of the third device or the fourth device.

6. The method as claimed in claim 1, wherein an access to network data is provided from the third device to the fourth device while the third device transmits the first content to the fourth device based on at least one of:
    an application requesting the access to the network data;
    device information associated with the fourth device seeking the access to the network data;
    a user-input; or
    a predefined data limit.

7. The method as claimed in claim 1,
    wherein content history is displayed on the third device, and the content history includes information about content transmitted by the third device,
    wherein a selection of content to be transmitted to the fourth device is detected by the third device, and the selection is performed based on the content history, and
    wherein the selected content is transmitted from the third device to the fourth device.

8. The method as claimed in claim 1, further comprising:
    detecting a message to request to change a host from the first device to the third device; and
    transferring one or more control rights of the content sharing group to the third device.

9. A device for sharing content configured to perform one of the methods of claim 1.

10. A method for sharing content in a third device, the method comprising:
    detecting a selection of first content desired to be shared in the content sharing group from a user of a third computing device while a first device included in the content sharing group transmits first content shared with the content sharing group to a second device included in the content sharing group;
    determining whether to share the first content with the content sharing group;
    sharing the first content in the content sharing group upon determining to share the first content with the content sharing group;
    receiving, from one of devices included in the content sharing group except for the third device, a message indicating selection of second content desired to be shared with the content sharing group;
    determining whether the second content is permitted to be shared with the content sharing group; and
    providing a notification indicating the determined result to the one of devices included in the content sharing group except for the third device.

11. The method as claimed in claim 10, further comprising:
    receiving information associated with second content to be downloaded;
    updating a list of contents based on the information; and
    receiving a notification indicating presence of the second content in the list of contents associated with one or more devices included in the content sharing group except for the third device.

12. The method as claimed in claim 11, further comprising:
    downloading a segment of the second content; and
    sharing the segment of the second content with the one or more devices included in the content sharing group except for the third device.

13. The method as claimed in claim 11, further comprising:
    receiving one or more segments of the second content from the one or more devices included in the content sharing group except for the third device; and
    merging the one or more segments of the second content.

* * * * *